US009775201B2

(12) United States Patent
Koolen

(10) Patent No.: US 9,775,201 B2
(45) Date of Patent: Sep. 26, 2017

(54) DIM RANGE ENHANCEMENT FOR LED DRIVER CONNECTED TO PHASE-CUT DIMMER

(75) Inventor: Gert-Jan Koolen, Aarle Rixtel (NL)

(73) Assignee: Silergy Corp., Cayman Islands (GB)

( * ) Notice: Subject to any disclaimer, the term of this patent is extended or adjusted under 35 U.S.C. 154(b) by 1405 days.

(21) Appl. No.: 12/989,822

(22) PCT Filed: Apr. 30, 2009

(86) PCT No.: PCT/IB2009/051760
§ 371 (c)(1),
(2), (4) Date: Oct. 27, 2010

(87) PCT Pub. No.: WO2009/136328
PCT Pub. Date: Nov. 12, 2009

(65) Prior Publication Data
US 2011/0043129 A1 Feb. 24, 2011

(30) Foreign Application Priority Data

May 7, 2008 (EP) .................................... 08155775

(51) Int. Cl.
*H05B 33/08* (2006.01)
*H05B 39/04* (2006.01)
(52) U.S. Cl.
CPC ....... *H05B 33/0815* (2013.01); *H05B 39/044* (2013.01)
(58) Field of Classification Search
CPC .......................... H05B 33/0815; H05B 39/044
(Continued)

(56) References Cited

U.S. PATENT DOCUMENTS 6,174,067 B1 * 1/2001 Thrasher ................ F21V 31/00
362/101
6,683,419 B2 * 1/2004 Kriparos ............ H05B 33/0851
315/224

(Continued)

FOREIGN PATENT DOCUMENTS

GB 2429542 A 2/2007

OTHER PUBLICATIONS

Rand, Dustin, et al; "Issues, Models and Solutions for Triac Modulated Phase Dimming of LED Lamps"; Power Electronics Specialists Conference 2007; IEEE, Piscataway, NJ, US; p. 1398-1404 (2007).

(Continued)

*Primary Examiner* — Douglas W Owens
*Assistant Examiner* — Amy Yang

(57) ABSTRACT

The present invention relates to a driving circuit (100) connected to a conventional phase-cut dimmer. A LED light source (30) is driven by a switched mode power supply (26), which is powered by the mains voltage through a phase-cut dimmer (10) and a rectifier (22). The current through the LED light source (30) is reduced according to the voltage level of the average rectified voltage Vin detected by a voltage sensor (24) and the on time limitation of the switched mode power supply (26). The current amplitude will be increasingly reduced towards the low voltage levels of Vin, namely towards the low dimmer knob levels. Thereby, the invention allows a LED light source driving circuit (100) connected to a conventional phase-cut dimmer to readily make the dimming curve of the LED light source (30) non-linear for being more compatible with the human eye sensitivity.

19 Claims, 5 Drawing Sheets

(58) Field of Classification Search
USPC .................. 315/185 R, 291, 224, 245, 209 R
See application file for complete search history.

(56) References Cited

U.S. PATENT DOCUMENTS

| | | | |
|---|---|---|---|
| 2003/0234621 | A1 | 12/2003 | Kriparos |
| 2004/0105283 | A1* | 6/2004 | Schie et al. ................. 363/21.12 |
| 2006/0125418 | A1* | 6/2006 | Bourgault ..................... 315/291 |
| 2007/0182338 | A1* | 8/2007 | Shteynberg ........ H05B 33/0815 315/200 R |

OTHER PUBLICATIONS

Lee, Stephen T. S., et al; "Triac Dimmable Electronic Ballast With Lamp Power Equaliztion"; Power Electronics Specialists Conference 2004, vol. 3, AACHE, DE; IEEE, Piscataway, NJ, US; pp. 1754-1760 (Jun. 20, 2004).

International Search Report and Written Opinion for Application PCT/IB2009/051760 (Apr. 30, 2009).

* cited by examiner

DIM RANGE ENHANCEMENT FOR LED DRIVER CONNECTED TO PHASE-CUT DIMMER

FIELD OF THE INVENTION

The present invention relates to the field of lighting devices, and more particularly to driving circuits for light emitting diodes (LEDs).

BACKGROUND OF THE INVENTION

Light emitting diodes (LEDs), also referred to as LED lamps or LED light sources, are being more widely used in a variety of applications, such as traffic signals and signage. Thus, LED light sources are expected to replace incandescent, halogen, and fluorescent lamps in many general illumination applications within a few years.

Several factors motivate replacement of LED light sources with incandescent lamps, also referred to as incandescent bulbs or light bulbs, including improvements in reliability, power consumption, heat generation, vibration resistance, and operating lifetime.

However, LED light sources and incandescent lamps have different electric and dimming properties, which make the replacement difficult.

Thus, connecting LED light sources to conventional phase-cut dimmers, operating for example in Pulse Width Modulation (PWM) mode and normally designed to be used with incandescent lamps, can cause problems due to the fact that the light output or intensity of these incandescent lamps is not constant during the 50/60 Hz phase, whereas LED light sources that normally use a constant current driver provide a constant light output. Indeed, this problem is related to the exponential behavior of the incandescent dimming curve.

As illustrated in FIG. 1, the dimming curve can be defined as the relation between the position of the dimmer knob of the conventional phase-cut dimmer (axis of abscissa) and the light output of the corresponding lamp (axis of ordinates). Thus, FIG. 1 shows that the dimming curve of the LED light source has a linear shape within the operating dim range between 15% and 85%, and that of the incandescent lamp has an exponential shape within this range at dimming levels below 60%, i.e. 0.6.

Yet, the human eye is a photoreceptor that responds logarithmically to a change in light intensity, such that for an exponential change of light intensity of a given amount, the eye perceives a change of a linear amount.

Thus, the exponential behavior of the incandescent dimming curve is rather desired with respect to the linear behavior of the LED light source dimming curve.

SUMMARY OF THE INVENTION

It is therefore an object of the present invention to provide a driving circuit connected to a phase-cut dimmer for driving a LED light source having a dimming curve more compatible with the physiological sensitivity of the human eye.

This object is achieved by a driving circuit as claimed in claim 1, a method as claimed in claim 5, a computer program as claimed in claim 8, and an integrated circuit as claimed in claim 9.

In accordance with the present invention, there is provided a driving circuit for driving a LED light source comprising at least:

a rectifier for rectifying a signal supplied by a phase-cut dimmer;

a sensor for detecting an average voltage of the rectified signal; and a switched mode power supply for driving the LED light source based on a signal that is output by the sensor, the signal having a voltage level proportional to the average voltage and the switched mode power supply being power-supplied by the rectified signal;

wherein the LED light source has a non-linear dimming curve. Thereby, the driving circuit allows a LED light source that is connected to a phase-cut dimmer to have a dimming curve non-linear instead of linear.

Moreover, the non-linear dimming curve can be close to an incandescent dimming curve at low light levels and a LED light source dimming curve at higher light levels. Thereby, the dimming curve can be more compatible with the physiological sensitivity of the human eye.

Furthermore, the switched mode power supply has a switching device with a limited on time, the limitation depending on the voltage level of the signal that is output by the sensor. Thereby, the current through the LED light source can be limited based on the average voltage detected by the sensor, and shaped in order to obtain the desired non-linear dimming curve.

As an application, the LED light source may be a retrofit LED light source.

In accordance with the present invention, there is provided a method comprising:

rectifying through a rectifier a signal supplied by a phase-cut dimmer;

detecting an average voltage of the rectified signal; and controlling, through a switched mode power supply, the current based on the average voltage such that the LED light source has a non-linear dimming curve;

wherein the switched mode power supply is power-supplied by a mains voltage through the phase-cut dimmer and the rectifier.

Thereby, the current through the LED light source can be shaped based on the average voltage of the rectified signal.

Furthermore, the non-linear dimming curve can be close to an incandescent dimming curve at low light levels and a LED light source dimming curve at higher light levels. Thereby, the current can be shaped for obtaining such a non-linear dimming curve.

Additionally, the step of controlling can comprise limiting an on time of a switching device within the switched mode power supply based on the average voltage. Thereby, the current can be limited and shaped based on the fluctuating average voltage.

The steps of the previous methods can be carried out by a computer program including program code means, when the computer program is carried out on a computer.

The present invention further extends to an integrated circuit comprising the preceding driving circuit.

BRIEF DESCRIPTION OF THE DRAWINGS

These and other aspects and advantages of the present invention will be apparent from and elucidated with reference to the embodiment(s) described hereinafter. In the following drawings.

DETAILED DESCRIPTION OF EMBODIMENTS

Figure 2:
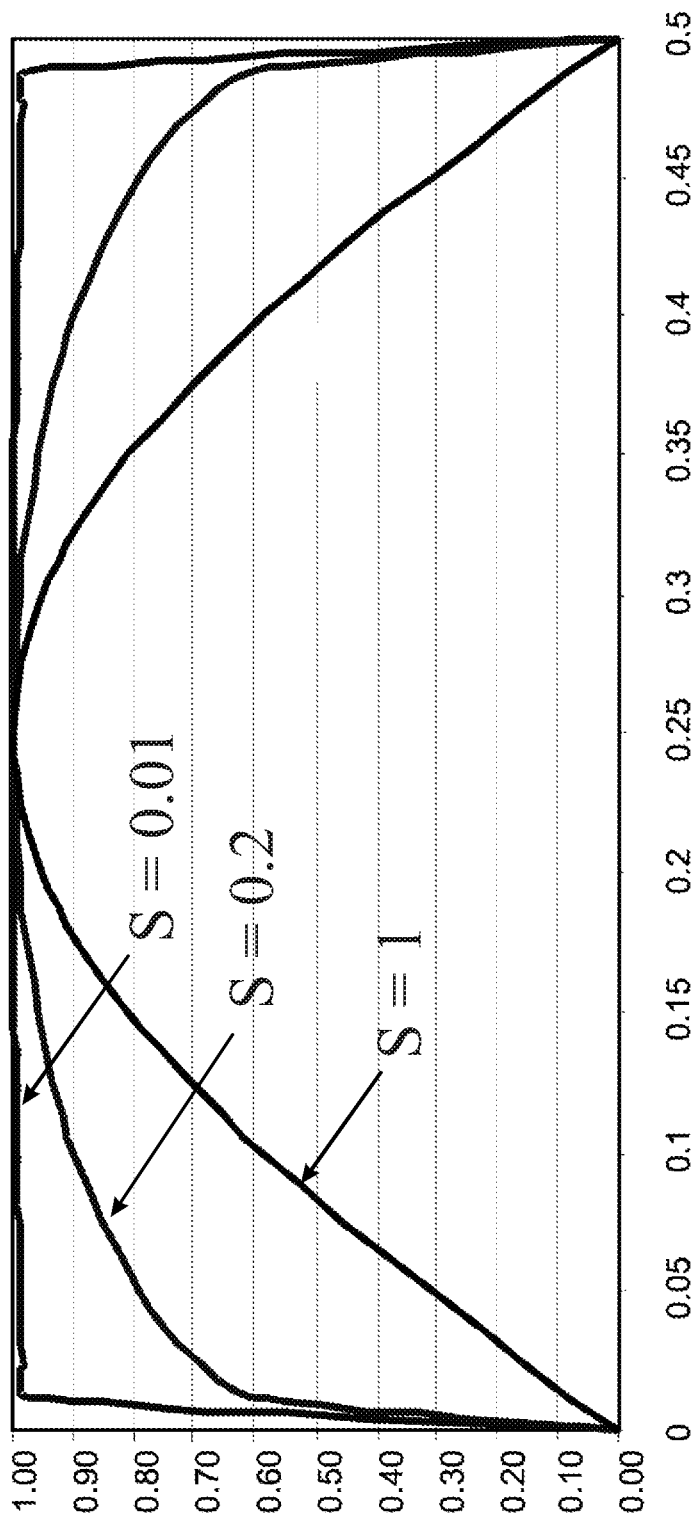
FIG. 2 shows a waveform within a half cycle of a normalized current $I/I_{max}$ (axis of ordinates) versus time (axis of abscissa) as a function of a shaping factor S (S=0.01; 0.2; 1), such as $I=I_{max}*(\sin(\omega t))^s$.

FIG. 2 illustrates a waveform of a normalized current $I/I_{max}$ within a half cycle as a function of a shaping factor S (S=0.01; 0.2; 1), such as $I=I_{max}* (\sin(\omega t))^s$. As can be seen in FIG. 2, if the LED light source 30 should be passed through by the current I, then the LED light source would be driven by a rather constant current when S=0.01, and driven by a sinusoidal current, namely a current proportional to the rectified mains voltage, when S=1.

Commonly, a standard AC mains voltage signal is supplied to a phase-cut dimmer 10. The phase-cut dimmer 10 adjusts the waveform of the AC signal into a phase-cut waveform based on the dimmer knob selection. Then, the phase-cut waveform is rectified through a rectifier 22 for providing a rectified signal.

Figure 1:
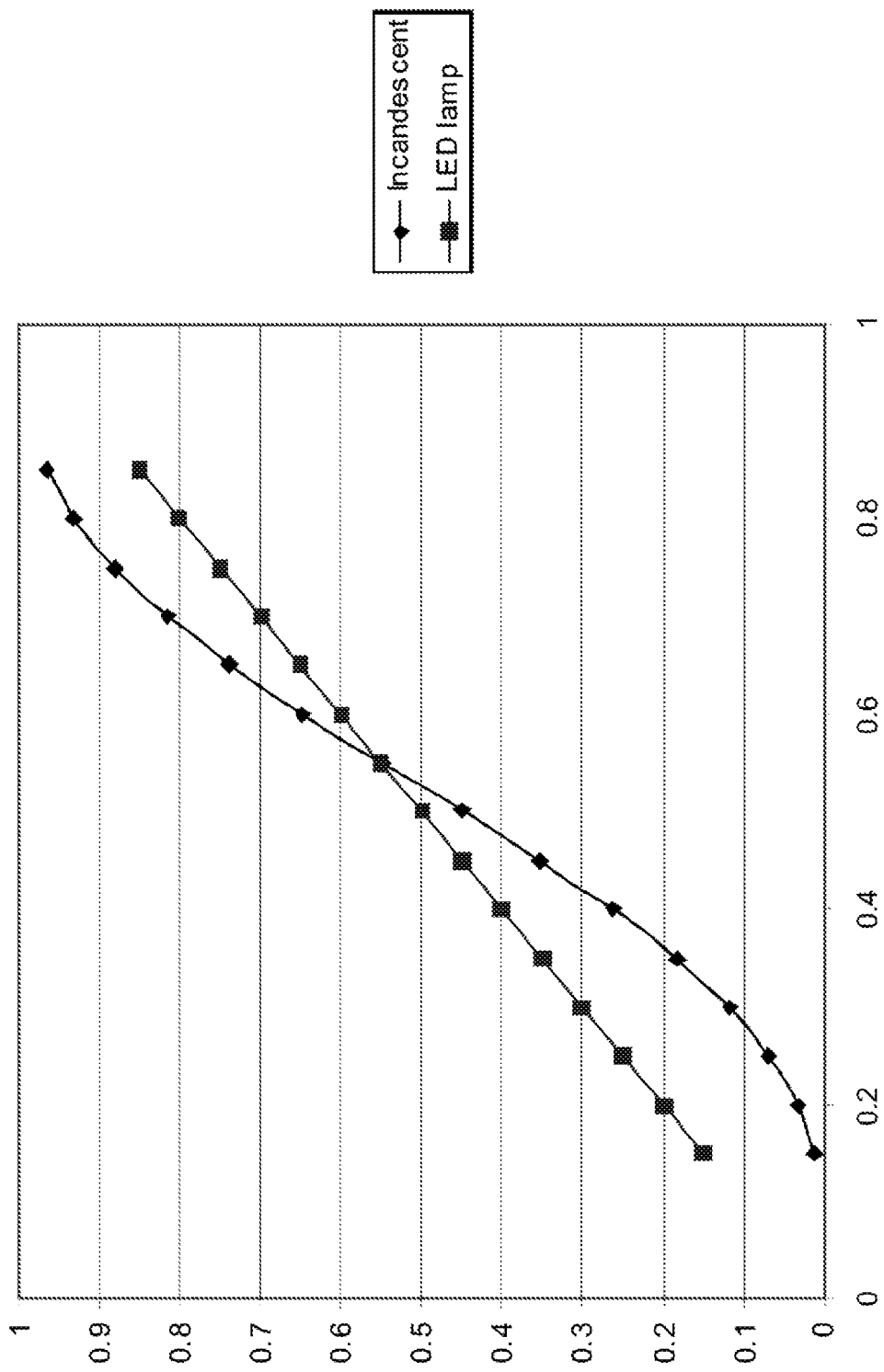
FIG. 1 shows exemplary dimming curves comparing the light outputs of a LED (■) and incandescent (♦) light source (axis of ordinates) versus the dimming level (axis of abscissa)
Figure 3:
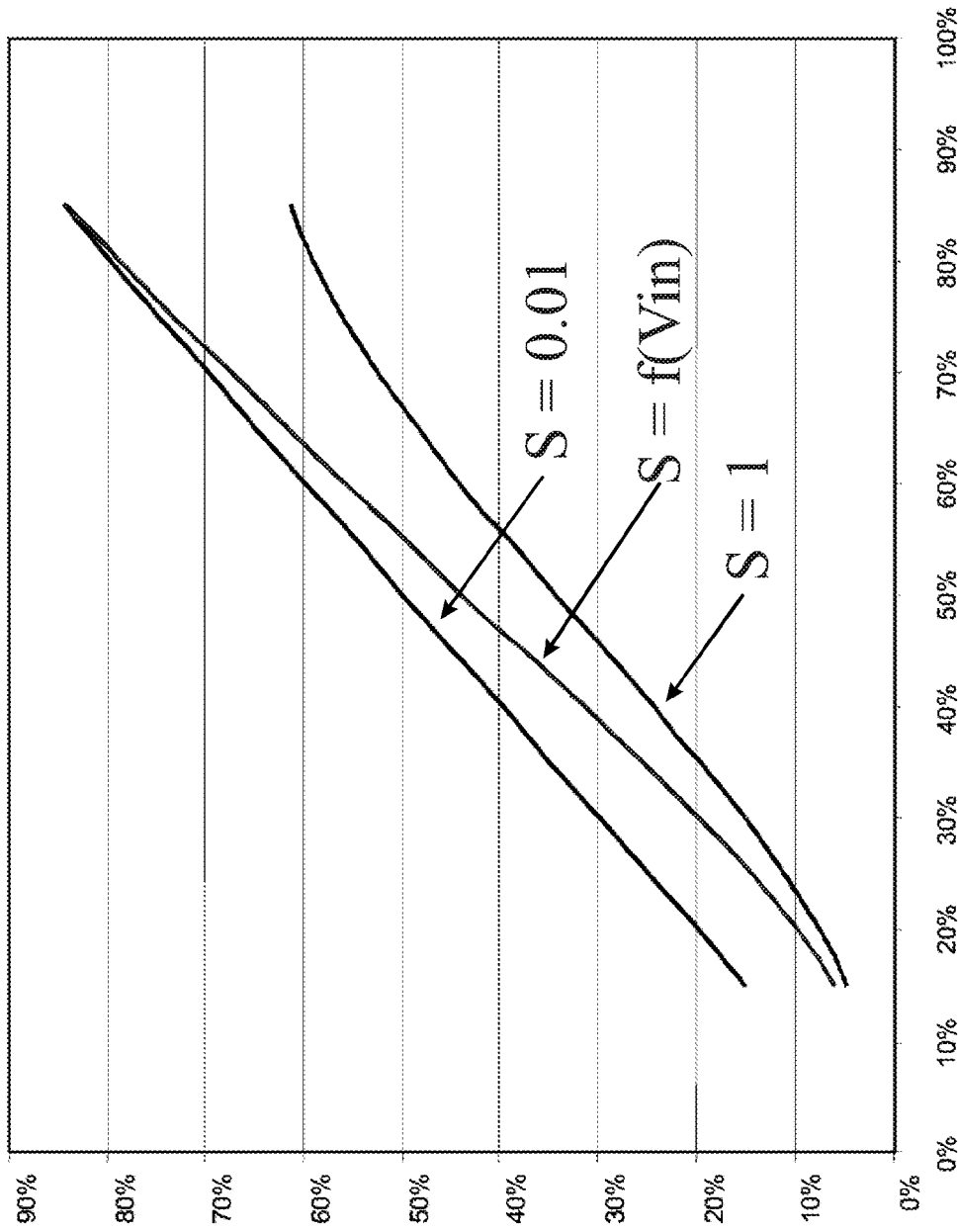
FIG. 3 shows exemplary dimming curves comparing the light output of a LED light source (axis of ordinates) versus the dimming level (axis of abscissa) as a function of a shaping factor S (S=0.01; 1; f(Vin)) that shapes the current through the LED light source.

FIG. 3 shows exemplary dimming curves comparing the light output of a LED light source 30 (axis of ordinates) versus the dimming level (axis of abscissa) as a function of a shaping factor S (S=0.01; 1; f(Vin)) that shapes the current through the LED light source 30. As shown in FIG. 3, if the value of the shaping factor S is made proportional to the average voltage Vin of the rectified signal, namely S=f(Vin), then the dimming curve of the LED light source can be shaped in a non-linear form and result in an enhanced dimming behavior. Indeed, it can be seen that the dimming curve for S=f(Vin) reaches a behavior close to that of the incandescent dimming curve of FIG. 1 at decreasing dimming levels and a behavior close to that of the LED light source dimming curve for S=0.01, i.e. close to that of the LED light source dimming curve of FIG. 1, at increasing dimming levels. Thus, at decreasingly low values of the average voltage Vin, namely at decreasingly low light levels, the current I through the LED light source 30 shall be increasingly reduced from its maximum value $I_{max}$ for emulating the incandescent behavior at the lowest light levels, namely providing a light output close to that of the incandescent light source. On the other hand, at increasingly high values of the average voltage Vin, namely at increasingly high light levels, the current I through the LED light source 30 shall be decreasingly reduced until to reach its maximum value $I_{max}$ for emulating its own LED light source behavior at the highest light levels, namely providing a light output close to that normally obtained when fully power-supplied.

Figure 4:
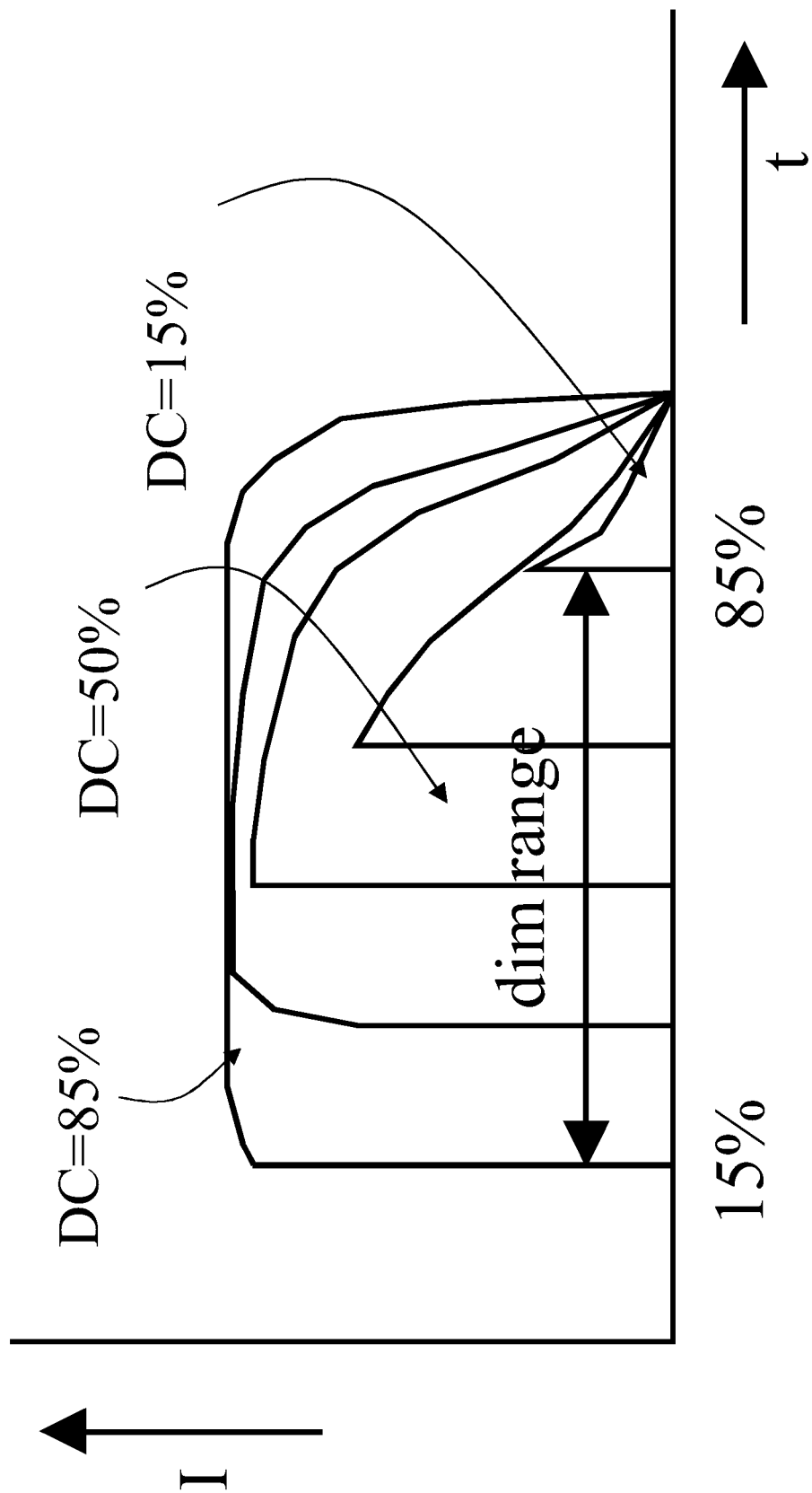
FIG. 4 shows a waveform of the dynamic shaped current passing through the LED light source versus the operating dim range, as a function of different dimming levels (DC=15%; 50%; 85%) and in the case that the shaping factor is S=f(Vin)

FIG. 4 depicts a waveform of the dynamic shaped current passing through the LED light source 30 versus the operating dim range between 15% and 85%, as a function of different dimming levels (DC) and in the case that the shaping factor is S=f(Vin).

Figure 5:
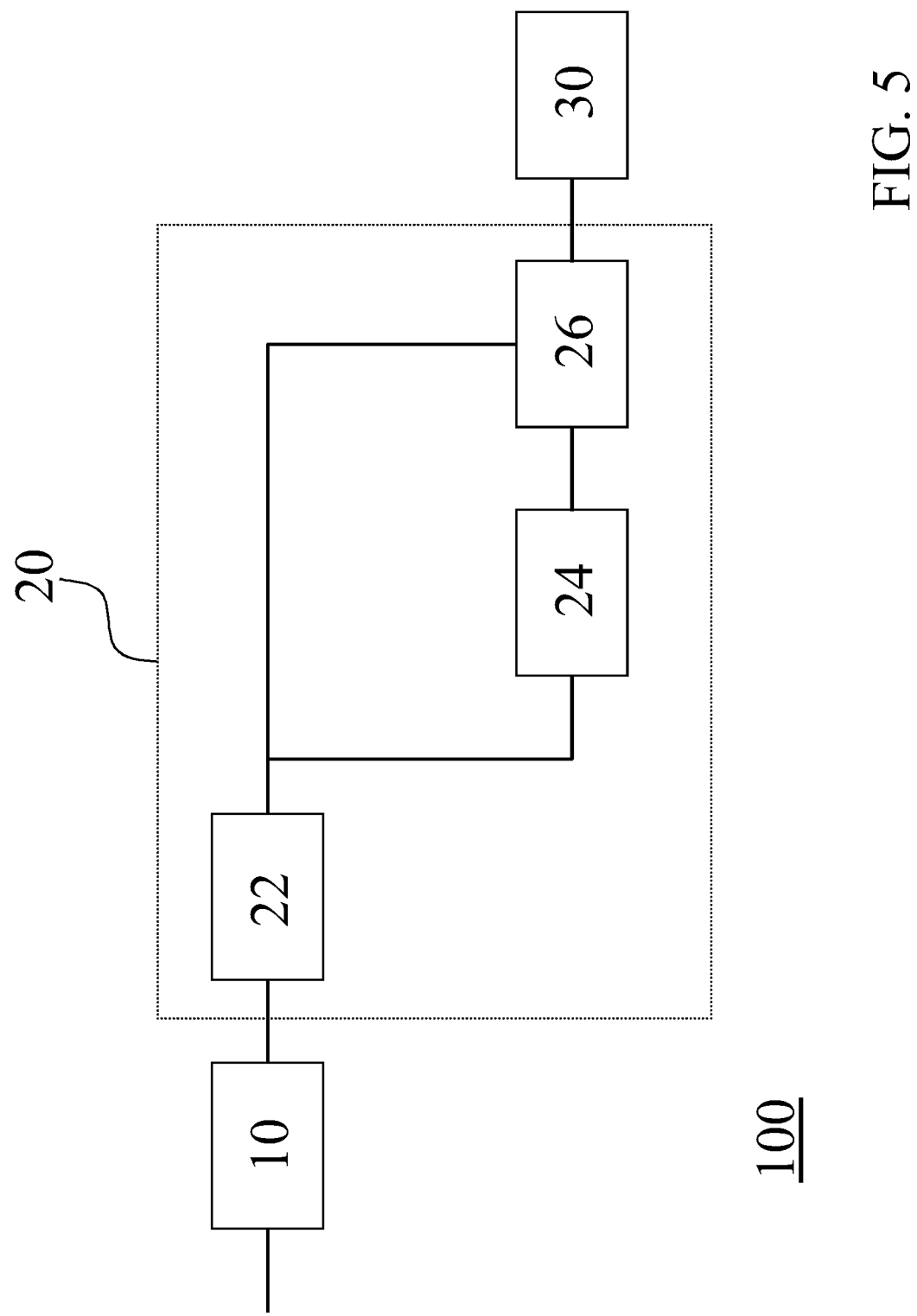
FIG. 5 shows a schematic diagram of a LED light source driving circuit connected to the output of a phase-cut dimmer.

FIG. 5 is a schematic diagram of a LED light source driving circuit 100 connected to the output of a phase-cut dimmer 10. The driving circuit 100 drives a LED light source 30 and comprises a rectifier 22, a voltage sensor 24 and a switched mode power supply (SMPS) 26 comprising for example a controller, a switching device and an inductive element.

The rectifier 22, e.g. a bridge rectifier, rectifies the phase-cut signal output by the phase-cut dimmer 10.

The voltage sensor 24 is input by the output of the rectifier 22 for detecting the average voltage Vin of the rectified signal, e.g. the root means square average, and deriving a signal having a value proportional to the average voltage Vin. The average voltage Vin being also proportional to the dimmer knob level, the voltage sensor 24 thereby behaves like a dimmer knob level detector that provides an output indicative of the dimmer knob level.

Voltage sensor 24 controls the maximum on time of the switching device within the switched mode power supply 26. In order to mimic the incandescent dimming curve at low dimming levels, the switched mode power supply 26 will be configured for increasingly reducing the on time and thus increasingly limiting the level of the current I through the LED light source 30 at decreasingly low values of the average voltage Vin. At higher dimming levels, the on time will be decreasingly reduced until to reach the maximum level $I_{max}$ of the current I through the LED light source 30. The reduction level will be determined in order to be in accordance with the dimming curve for S=f(Vin) of FIG. 3.

In an embodiment, the switched mode power supply 26 may be a TEA1523 STARplug™ commercially available from NXP Semiconductors. In that case, the pin REG can be the input of the switched mode power supply 26 for controlling the on time of the switching device.

The switching device, e.g. a gate-controlled switch, within the switched mode power supply 26 is driven a pulse form whose pulse width is a function of the voltage level at the input of the switched mode power supply 26, which voltage level is proportional to the average voltage Vin.

The LED light source 30 is driven by the output of the switched mode power supply 26, which is powered by the mains voltage through the phase-cut dimmer 10 and the rectifier 22. The LED light source 30 is passed through by the current I, whose amplitude is dependent on both the reduction level set by the switched mode power supply 26 through the on time limitation and the average voltage Vin, respectively controlled and detected by the sensor 24.

Applications contemplated for such driving circuit 100 include dimmable lighting applications using conventional phase-cut dimmers, and in particular the retrofit LED light source control.

In summary, a driving circuit 100 connected to a conventional phase-cut dimmer has been described. A LED light source 30 is driven by a switched mode power supply 26, which is powered by the mains voltage through a phase-cut dimmer 10 and a rectifier 22. The current through the LED light source 30 is reduced according to the voltage level of the average rectified voltage Vin detected by a voltage sensor 24 and the on time limitation of the switched mode power supply 26. The current amplitude will be increasingly reduced towards the low voltage levels of Vin, namely towards the low dimmer knob levels. Thereby, the invention allows a LED light source driving circuit 100 connected to a conventional phase-cut dimmer to readily make the dimming curve of the LED light source 30 non-linear for being more compatible with the human eye sensitivity.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single or other unit may fulfil the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A driving circuit configured to drive a light-emitting diode (LED) light source, said driving circuit comprising:
    a rectifier configured to rectify a signal supplied by a phase-cut dimmer;
    a sensor receiving an output of said rectifier, and being configured to detect an average voltage of said rectified signal, and to generate a sensor output signal having a voltage level proportional to said detected average voltage and to a dimmer knob level; and
    a switched mode power supply having a switching device, and being configured to drive said LED light source based on said sensor output signal, said switched mode power supply being power-supplied by said rectified signal, wherein said LED light source has a non-linear dimming curve that is formed by increasingly reducing a current through said LED light source at decreasingly low light levels, and by decreasingly reducing said current through said LED light source at increasingly high light levels until reaching a maximum value.

2. The driving circuit of claim 1, wherein said non-linear dimming curve is close to an incandescent dimming curve at low light levels and close to a dimming curve of said LED light source at higher light levels.

3. The driving circuit of claim 2, wherein an on time of said switching device is reduced by a pulse-width modulation signal according to said sensor output signal.

4. The driving circuit of claim 2, wherein said LED light source comprises a retrofit LED light source.

5. The driving circuit of claim 1, wherein an on time of said switching device is reduced by a pulse-width modulation signal according to said sensor output signal.

6. The driving circuit of claim 5, wherein said LED light source comprises a retrofit LED light source.

7. The driving circuit of claim 1, wherein said LED light source comprises a retrofit LED light source.

8. An integrated circuit comprising said driving circuit as claimed in claim 1.

9. The driving circuit of claim 1, wherein said phase-cut dimmer has an operating dim range between 15% and 85%.

10. The driving circuit of claim 1, wherein said switched mode power supply further comprises a controller and an inductive element.

11. The driving circuit of claim 1, wherein said rectifier comprises a bridge rectifier.

12. The driving circuit of claim 1, wherein a shaping factor of said current through said LED light source is a function of said detected average voltage.

13. The driving circuit of claim 1, wherein said switched mode power supply increasingly limits a level of said current through said LED light source at decreasingly low levels of said detected average voltage.

14. The driving circuit of claim 1, wherein a voltage level at an input of said switched mode power supply is proportional to said detected average voltage.

15. The driving circuit of claim 1, wherein an amplitude of said current in said LED light source depends upon both a level set by said switched mode power supply and said detected average voltage.

16. A method of shaping a current through a light-emitting diode (LED) light source, said method comprising:
    rectifying, through a rectifier, a signal supplied by a phase-cut dimmer;
    detecting, by a sensor receiving an output of said rectifier, an average voltage of said rectified signal, and generating a sensor output signal having a voltage level proportional to said detected average voltage and to a dimmer knob level; and
    controlling, through a switched mode power supply having a switching device, said current based on said sensor output signal such that said LED light source has a non-linear dimming curve that is formed by increasingly reducing said current through said LED light source at decreasingly low light levels, and by decreasingly reducing said current through said LED light source at increasingly high light levels until reaching a maximum value, wherein said LED light source is power-supplied by a mains voltage through said phase-cut dimmer and said rectifier.

17. The method of claim 16, wherein said non-linear dimming curve is close to an incandescent dimming curve at low light levels and close to a dimming curve of said LED light source at higher light levels.

18. The method of claim 17, wherein an on time of said switching device is reduced by a pulse-width modulation (PWM) signal according to said sensor output signal.

19. The method of claim 16, wherein an on time of said switching device is reduced by a pulse-width modulation signal according to said sensor output signal.

* * * * *